United States Patent [19]

Wesemeyer et al.

[11] 4,267,810
[45] May 19, 1981

[54] CONTROL SYSTEM FOR CONTROL OF REPETITIVE EVENTS, E.G. IGNITION, FUEL INJECTION, IN INTERNAL COMBUSTION ENGINES

[75] Inventors: Jürgen Wesemeyer, Nuremberg; Georg Haubner, Berg; Werner Meier, Rednitzhembach; Hans Schrumpf, Oberasbach, all of Fed. Rep. of Germany

[73] Assignee: Robert Bosch GmbH, Stuttgart, Fed. Rep. of Germany

[21] Appl. No.: 42,360

[22] Filed: May 25, 1979

[30] Foreign Application Priority Data

Jun. 7, 1978 [DE] Fed. Rep. of Germany ....... 2824981
Aug. 22, 1978 [DE] Fed. Rep. of Germany ....... 2836614
Nov. 28, 1978 [DE] Fed. Rep. of Germany ....... 2851336

[51] Int. Cl.³ .............................................. F02P 5/04
[52] U.S. Cl. .................................... 123/416; 123/417; 123/414
[58] Field of Search .......... 123/117 R, 117 D, 32 EB, 123/32 EC

[56] References Cited

U.S. PATENT DOCUMENTS

| | | | |
|---|---|---|---|
| 4,063,539 | 12/1977 | Gorille et al. | 123/117 D |
| 4,064,846 | 12/1977 | Latsch et al. | 123/117 D |
| 4,099,495 | 7/1978 | Kiencke et al. | 123/32 EB |
| 4,146,001 | 3/1979 | McCarthy et al. | 123/117 R |
| 4,162,665 | 7/1979 | Grather et al. | 123/117 R |
| 4,174,688 | 11/1979 | Honig et al. | 123/117 D |
| 4,174,696 | 11/1979 | Jundt et al. | 123/117 R |

*Primary Examiner*—P. S. Lall
*Attorney, Agent, or Firm*—Frishauf, Holtz, Goodman & Woodward

[57] ABSTRACT

In order to permit a simplification of the crankshaft rotation sensor device which provides the computer of the control system with angular speed and position information for ignition and/or fuel injection timing, a signal generated by one pickup for every two engine cylinders from a single reference mark on the crankshaft is formed into a signal pulse which is used to trigger the counting of clock pulses from a clock into a counter. These are then periodically transferred to a computer as a numerical signal which represents the required information. In a first mode the counts are transferred every other period between pulses and the counter counts in the cycle periods between the pulses in which the counter is not transferring to the computer. In a second mode, the counter counts every cycle between pulses and the counts are transferred during every pulse itself. There is also described a system which includes additional circuitry by which below a certain speed of the engine the system operates in the first mode and above that speed operates in the second mode.

17 Claims, 5 Drawing Figures

CONTROL SYSTEM FOR CONTROL OF REPETITIVE EVENTS, E.G. IGNITION, FUEL INJECTION, IN INTERNAL COMBUSTION ENGINES

The present invention relates generally to the electronic control of repetitive events in reciprocating combustion engines and relates especially to the control of the ignition and/or the fuel injection.

BACKGROUND AND PRIOR ART

Electronic control systems for controlling reciprocating combustion engines typically control the ignition, the fuel injection and, if desired, certain other functions. Examples of such systems are described for instance in the U.S. Pat. Nos. 4,063,539, Gorille et al., and 4,099,495 Kienke et al, both assigned to the assignee of this application. These systems generally use a sensor which senses the rotation of the crankshaft and a computer which processes the information from the sensor to produce useful output signals which can be amplified to operate transistor switches at the proper times for obtaining the desired control of the events. The sensors are either of the segment type or the increment type, having a plurality of markers which control counting in a counting stage. Both of these sensor types are relatively complex and costly. The segment type requires a high degree of precision for the parts and their angular orientation which leads to problems in the width or angular extent of the sensor signals, with respect to shaft rotation. Also, it is difficult to maintain constant the angular spread of the signals with changes in the engine speed. The increment sensors require a plurality of marks for sensing and need additionally a reference mark and a separate pickup for it.

THE INVENTION

It is an object to provide a control system for an engine in which the sensor is simplified, while still providing the rotation information for the computer with sufficient accuracy.

Briefly, a single reference mark for the sensor is rotated past and sensed by a pickup element which generates an output signal, in the form of needle, or sharp, abrupt pulses. The output signal is converted to a sensor pulse which is used by logic switches to trigger the counting of clock pulses from a clock frequency generator into a counter so that the counts in the counter are representative of the rotational speed. The stored counts are transferred periodically by the logic switches to the computer and are processed therein to provide the appropriate output. In one mode, the counts are transferred to the computer during every other cycle period between sensor pulses and the counter counts only during every other cycle period. In another mode, the counts are transferred to the computer during the next signal pulse for computation during occurrence of the pulse, so that the counter counts during every cycle period between signal pulses and the counts are transferred during every signal pulse. In accordance with a particularly suitable arrangement, there is provided an additional circuit with logic switches to operate the control system in the manner of the first mode for engine speeds above a certain level and to operate the control system in the second mode for engine speeds below this speed level.

The system has the advantage that the transducer arrangement itself can be substantially simplified; in the simplest form, it can be a single marker which provides an output pulse to a single stationary pickup just once for each revolution of the crankshaft. This arrangement has substantial advantages, particularly in similar engines when compared with segmental-type transducers which must generate a plurality of signals having an essentially uniform angular (with respect to crankshaft rotation) extent. The small number of markers which can be placed circumferentially on a marker disk, or a marker picked up by only a few stationary transducers, simplifies manufacture and adjustment. The markers can be arranged, for example, in the form of small magnets, on any suitable rotating element of the internal combustion engine.

The electronic system can easily be duplicated, particularly when using integrated circuit (IC) technology. In a particularly simple way, and using a further impulse pickup with a duplicate electronic system, multi-cylinder engines can be supplied with properly timed ignition or injection pulses. High-voltage distribution can be effected without a distributor at the cost of an additional ignition coil, thereby eliminating the rotating distributor arrangement and providing a static distribution system without mechanically movable parts. Combining the two modes of operation has the advantage that, at low speeds, for example upon starting, the speed is frequently and accurately established and rapidly varying speed changes are quickly applied to the computer for processing therein, so that the eventual output signals which control the respective events—ignition or fuel injection, for example, will be accurately matched to the then existing speed. Modern high-speed electronic computers, for example of the single chip microcomputers or microprocessors, which are commercially available as standard articles of trade, can carry out the necessary computations even in the short time period during which the control pulse from the transducer persists, leaving the pulse gap until the next pulse for counting to develop a speed representative count number.

DRAWINGS

Figure 1:
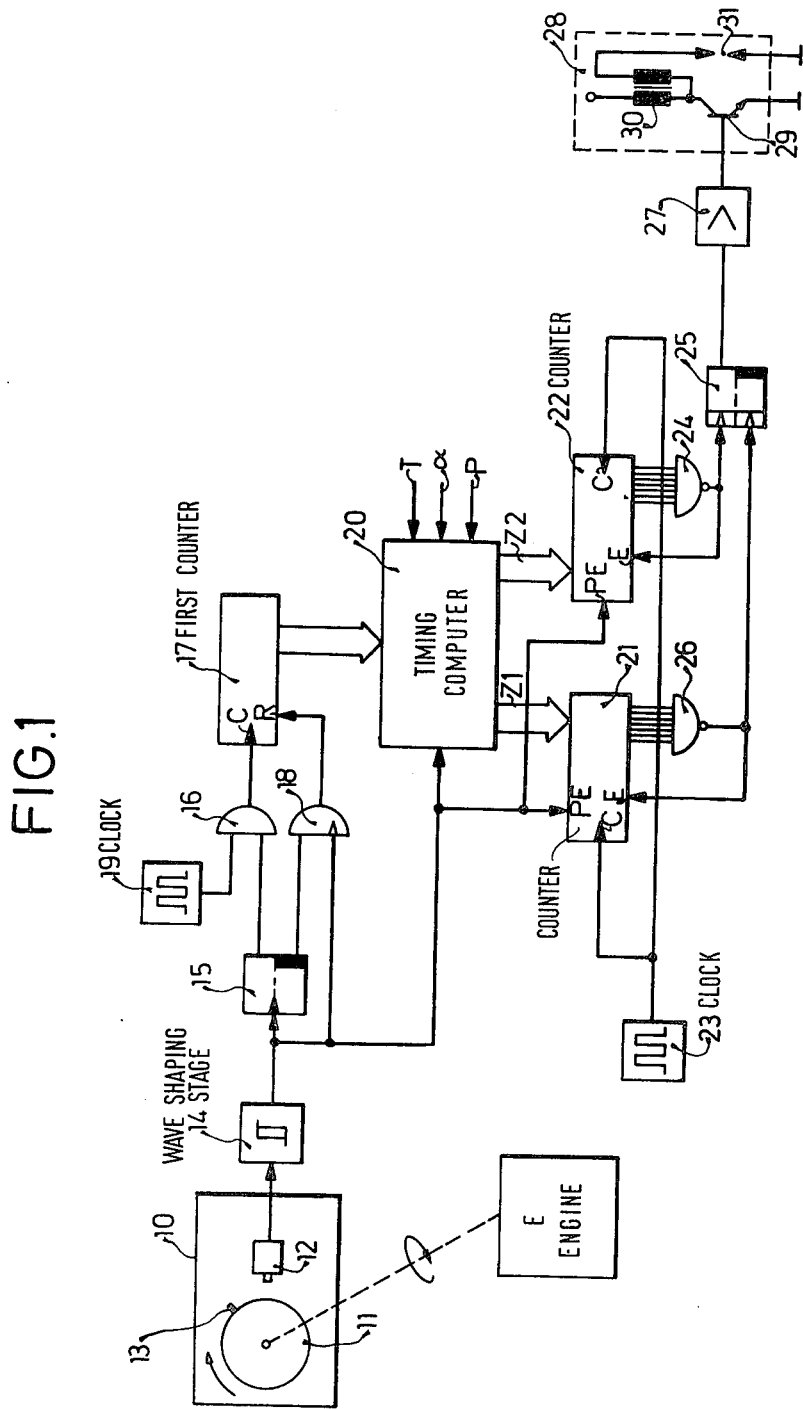
FIG. 1 is a highly simplified block diagram of a control system, in accordance with a first embodiment of the present invention, using a single pulse producing source or transducer.

First embodiment, FIG. 1: A sensor or transducer 10 has a rotating disk 11 coupled to the crankshaft of a combustion engine E and a pickup 12 for sensing a sensor mark 13 on the disk 11. The pickup 12 can be of the optical, inductive, Hall or Wiegand transducer type. The mark 13 must accordingly be made of optically contrasting or of magnetic, especially ferromagnetic material.

The output of the sensor 10 is connected via a Schmitt trigger wave shaping or pulse former stage 14 to the input of a flip-flop (FF) 15 of the D-FF type. One output of the FF 15 is connected through an AND-gate 16 with the clock input C of a first counter 17. The second, complementary output of the FF 15 is connected through an AND-gate 18 to the reset input R of the counter 17. The second input of the AND-gate 16 is connected to a clock frequency generator 19. The second input of the AND-gate 18 is connected to the output of the pulse former stage 14.

The numerical outputs of the first counter 17 and the output of the pulse former stage 14 are connected to an ignition computer 20. Such an ignition computer is already known, as discussed above, and is preferably a microcomputer with a microprocessor. A single-chip microcomputer is particularly suited for this, since it can include on a single chip not only the microprocessor itself, but also the working and fixed memories and the clock frequency generator 19. In principle, in such a computer a constant is divided by the counts of the counter 17, which counts are dependent upon the rotational speed. Or, a read-only memory (ROM) is addressed by the count of the counter 17 and delivers the numerical output values. Various correction factors relating to other parameters of the engine, such as the temperature T, the throttle setting $\alpha$, the vacuum and so on can be taken into consideration in this computation.

The output of the pulse former stage 14 is further connected with the PE (preset enable) inputs of two further counters 21, 22 to which the numerical output values from the computer 20 are applied. A further clock frequency generator 23 is connected to the clock frequency inputs C of the counters 21, 22. The further clock frequency generator 23 could also be replaced with a scaled-down frequency of the first clock frequency generator 19. The numerical outputs of the counter 22 are connected via a first decoding stage 24 to the dynamic SET input of FF 25. The numerical outputs of the counter 21 are correspondingly connected through a decoding stage 26 with the dynamic RESET input of the FF 25. When the counters 21, 22 reach a particular count, the decoding stages 26, 24 respond to give an output signal. In the simplest case, for decoding the smallest numerical values, the decoding stages 24, 26 can be designed as NAND-gates. For other numerical values, the inputs of the decoding stages are accordingly in part negated. The output of the decoding stage 24 is also connected with the E (enable) input of the counter 22, and correspondingly the output of the decoding stage 26 is connected with the E input of the counter 21. The output of the flip-flop 25 is connected through an amplifier stage 27 to a control output stage 28 for controlling the repetitive event, e.g. ignition and/or the fuel injection. For the ignition, such a control stage usually consists of an ignition transistor 29 in the primary current circuit of an ignition coil 30 which has at least one ignition path 31, especially a spark plug, in its secondary circuit.

Figure 2:
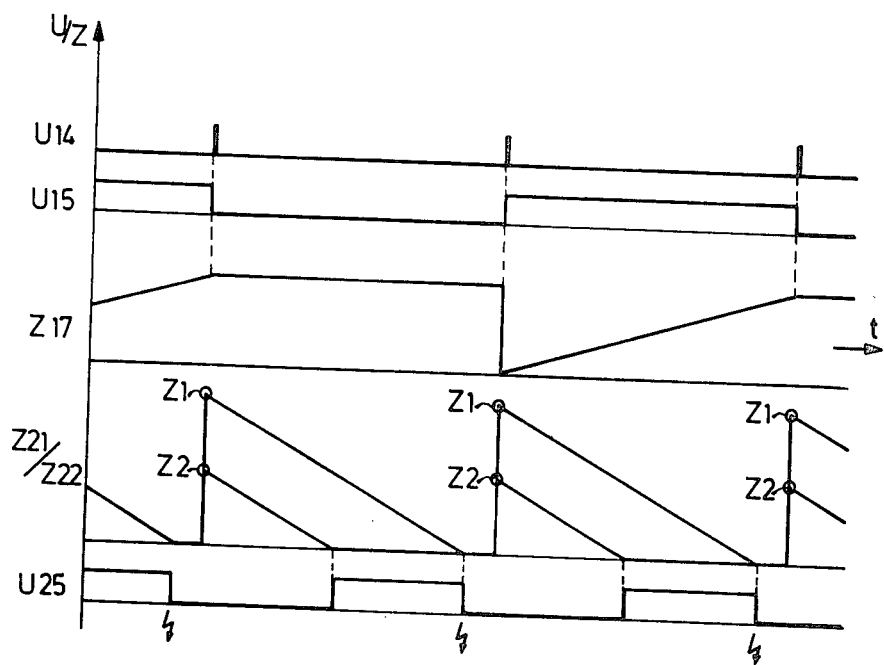
FIG. 2 is a signal diagram of the signals in the system of FIG. 1.

Operation, with reference to the signal diagrams of FIG. 2: A short pulse is generated by the sensor 10 for each revolution as the mark 13 passes by the pickup. This arrangement suffices for a two-cylinder four-cycle engine. For four cylinders, there are two marks 13 mutually displaced angularly by 180 degrees. The number of the marks 13 may correspond to half the number of cylinders. A pulse train U14 of sharp, abrupt needle pulses appears at the output of the pulse former stage 14 and switches over the FF 15 with each new pulse 14. During the signal U15, the clock frequency of the clock frequency generator 19 is therefore passed through the AND-gate 16, and the counter 17 counts upward at this clock frequency. When the signal U15 ends, the AND-gate 16 is blocked and the count reached in the counter 17 is retained for the time being. A reset pulse for the counter 17 is passed through the AND-gate 18. A slight delay can be applied to the C input to counter 17 to permit sequencing of the RESET and the next counting pulses, as known. The signals U14 serve as angle reference marks which determine the computing cycles for the computer 20. From the counts Z17 and from numerical values dependent upon other parameters of the engine, as the case may be, the computer determines two numerical output values Z1 and Z2. The signals U14 are applied to the counters 21 and 22 as setting signals for transferring to them in each case the numerical values Z1, Z2. The counters 21, 22 are connected as reverse counters and count backwards at the clock frequency of the clock frequency generator 23. When the counts of the counter 22 reach the decoding value of the decoding stage 24, preferably a zero value, then (1) the FF 25 is SET by the thereby generated output signal of the decoding stage 24, and (2) the counter 22 is blocked to further counting operations by the signal at blocking input E. When, at a later time, the counter 21 reaches the decoding value of the decoding stage 26, then the FF 25 is RESET and the counter 21 is likewise blocked to further counting operations. The signal U25 at the output of the FF 25 is the control signal for the control output stage 28. For an ignition system, the signal U25 is the dwell angle signal (it can, of course, also be an injection valve open signal) which controls the transistor 29 to conduct, which causes a magnetic field buildup in the ignition coil 30. At the end of the signal U25, the transistor 29 is blocked and an ignition spark is induced, as schematically shown by the lightning symbol in FIG. 2.

Figure 3:
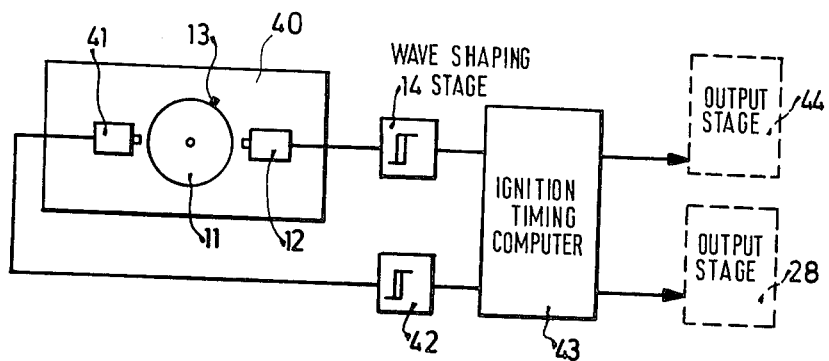
FIG. 3 is a highly simplified block diagram of a modified form of a sensor for the system of FIG. 1 having two transducers.

Second embodiment, FIG. 3: A modified sensor 40 includes a second pickup 41 in addition to the components 11-13. A second pulse former or wave shaping stage 42 is provided for the second pickup 41. Signals from the pulse former stages 14, 42 are led to a computer 43, which incorporates the functions of the components 15-27 of the first embodiment. In accordance with control from two pickups, these functions are each present in duplicate, and the processed signals control two output stages 28, 44. For an ignition system, these are two ignition output stages, each with an ignition coil, so that for a plurality of spark plugs a mechanical high voltage distributor can be eliminated if a sufficient number of ignition output stages are provided. This system is especially simple and advantageous if it uses a commercially available single-chip computer, such as for example one marketed by the Intel Corporation and identified as No. 8048 or 8021.

The counts in the counter 17 can also be stored in a further counter or memory, so that the counter 17 can begin counting anew with each pulse U14.

Figure 4:
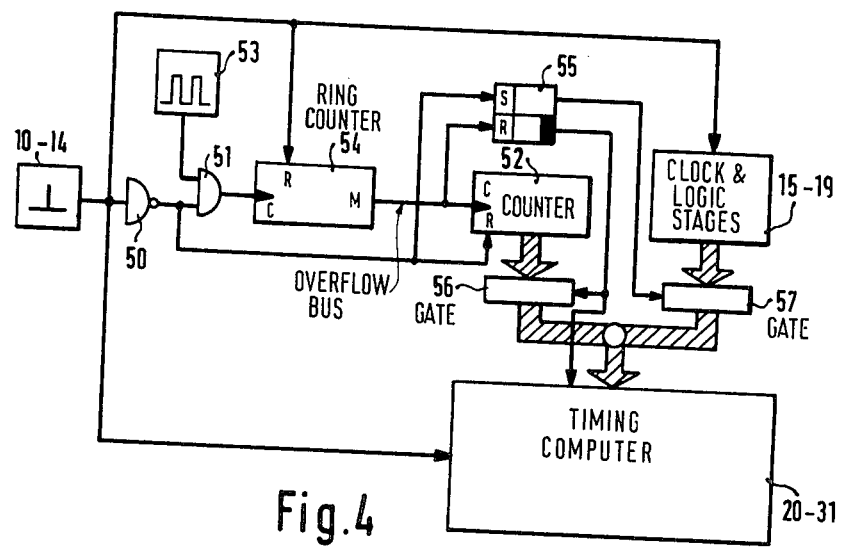
FIG. 4 is a highly simplified block diagram of a control system in accordance with a third embodiment of the present invention.

Third embodiment, FIG. 4: The components already shown and described in FIGS. 1-3 are identified by the same reference numerals and are not again described. The sensor 10 and the pulse former stage 14 are connected to an additional circuit stage which includes an inverter 50 connected to an input of an AND-gate 51 and also to the reset input R of a counter 52. The second input of the AND-gate 51 is connected to a clock frequency generator 53. As a rule, the frequency of the clock frequency generator 53 and any other clock frequencies are derived as needed by scaling from the basic clock frequency of a single generator, e.g. clock 19 (FIG. 1). The output of the AND-gate 51 is connected to the clock input C of a ring counter 54 which likewise has its reset input R connected with the output of the sensor 10, 14. The overflow output M (min-max output) is connected to the clock input C of the counter 52 and the reset of an FF 55, the set input of which is connected to the output of the inverter 50. The inputs of the FF 55 are all dynamic inputs. The numerical outputs of the counters 52 are connected to the numerical inputs of the computer 20 or the processing stage 20-31 through a first gate 56. Gate 56 is, e.g. a transmission gate such as component CD 4016 marketed by RCA.

The numerical outputs of the stage 15-19, shown in more detail in FIG. 1, are likewise connected with the numerical inputs of the computer 20 through a further gate 57. The gate 57 is controlled by an output of the FF 55, and the gate 56 is controlled by the other, complementary output of the FF 55. This complementary output of the FF 55 is also connected to the computer 20.

Figure 5:
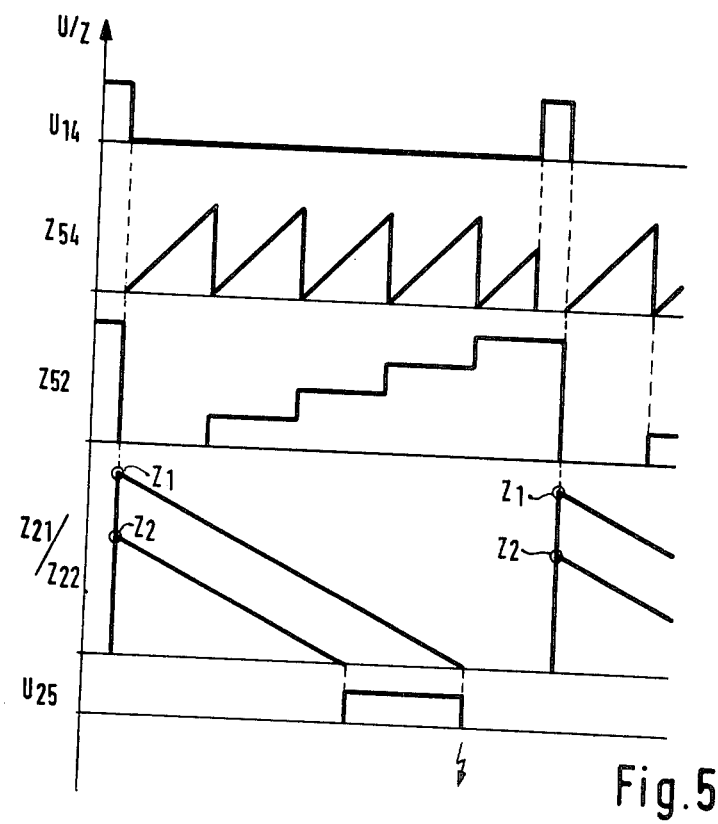
FIG. 5 is a signal diagram of the signals in the system of FIG. 4.

Operation of embodiment shown in FIG. 4, with reference to the signal diagrams of FIG. 5: In the previous embodiments, a numerical value dependent upon the engine speed was counted out between two pulses U14 during a first cycle. In the following cycle between two sensor pulses, the processing in the computer took place. In accordance with FIGS. 4 and 5, only the numerical value dependent upon the engine speed is determined in the time between two sensor pulses U14. The processing is accomplished in the computer during a sensor pulse. At very low engine speeds the time period of the sensor pulse is very short compared to the entire cycling period (pulse plus pulse gap). The duration of the sensor pulse is sufficient for carrying out the computation. In the embodiments shown in FIGS. 1-3, control of the starting process of the engine is difficult since the rotational speed changes very rapidly, resulting in errors in the ignition timing or the fuel injection which arise because a correction is made only at every second sensor pulse.

As long as no sensor pulse U14 is present, the counter 54 carries out cyclical counting processes, with the count number of the counting cycles being determined solely by its counting capacity. When the count reaches the capacity of the counter, an overflow pulse is generated at the overflow output M, by which (1) the FF 55, set by the sensor pulse U14, is reset and (2) a count of ONE is added to the counter 52. This results in a frequency scaling of the clock frequency by a factor which corresponds to the maximum count in the counter 54. By the resetting of the flip-flop 55, the gate 57 is blocked and the gate 56 is opened, so that the numerical outputs of the counter 52 are connected with the computer 20. At the start of the signal U14, the counting process in the counter 54 is stopped and the so determined speed-dependent numerical value is transferred to the computer 20. The evaluation and computational processing follows as in the above already-described embodiments, but with the difference that it takes place during the time duration of a sensor pulse U14. With the trailing edge of a pulse U14 the speed-dependent numerical values Z1 and Z2 in the computer are transferred to the counters 21 and 22. At the same time, the counter 52 is reset and the flip-flop 55 is set, thus blocking the gate 56 and opening the gate 57.

As the rotational speed increases, the number of cycles counted in the counter 54 and thus the number of counts in the counter 52 decrease. At a given speed of, e.g. 700 rpm, the counter 54 no longer reaches its maximum count, and no overflow pulse is generated. Consequently, the counter 52 remains at a zero count and the FF 55 continues to be in SET state, so that the numerical values generated in the stage 15-19 of the apparatus of FIG. 1 are applied through the gate 57 to the computer 20 when the next sensor pulse is produced. Above this predetermined speed the control signal (dwell period) is produced as in the embodiments of FIGS. 1-3. The switching over of the computer 20 itself between the two modes is accomplished with the complementary output of the FF 55.

The elements 50-54, together with the elements 20-31 and 10-14 can also be used as an independent ignition system in place of the auxiliary starting control, so long as the engine speeds are not too high and/or a very fast computer is used. In such a case, the elements 15-19 and the components 55-57 can be eliminated. A very simple sensing device 10-14 can be used in which the length of a generated sensor signal U14 is, in principle, not critical. The length need only be sufficient to permit completion of the computing process. This condition is readily met with a fast computer and at low engine speed. The leading and trailing edge of the signal U14 need not be precisely determined, since the length of the signal U14 is very small compared to the gap to the next signal U14.

The third embodiment can also be realized especially simply and advantageously by means of a microcomputer.

Particularly advantageous dynamic values are obtained in the described embodiments when the sensor mark 13 is located on the disk 11 at a place which corresponds to the greatest possible advance angle and, preferably, also an additional safety angle. For example, if the greatest possible advance angle is 35 degrees, then the mark is located so that the trailing edge of the pulse generated by it appears at an angle of 40 degrees before top dead center (TDC) of a reference piston. This means adding a safety angle of 5 degrees. Thus, the sensor mark should be as close as possible to the maximum advance angle.

If the sensing device 10 has an inherent advance adjustment, as inductive sensors generally have, then this can be taken into account by subtracting the adjustment angle. For an adjustment angle of 10 degrees, for example, the mark 13 for the above example is so located that the trailing edge of the pulse generated by it appears at an angle of 30 degrees before TDC.

Various changes and modifications may be made, and features described in connection with any one of the embodiments can be used with any of the others, within the scope of the inventive concept. The invention has been described in connection with an ignition system; controlled switch 29 (FIG. 1) can equally be used to control the opening time of fuel injection valves, in which case the output stage 28 will be constructed in accordance with technology appropriate to fuel injection systems, and the computer 20 will compute the open-time of the respective injection valve or valves, based on selected engine operating parameters.

We claim:

1. System to control the operation of repetitive events in cylinder-piston type internal combustion engines having a transducer (10, 40) coupled to the crankshaft of the engine;

at least one output stage (27, 28) including a controlled switch (29) connected to and controlling the respective event;

and an electronic computing stage (20, 43) connected to and controlled by the transducer and furnishing output signals to the output stage for control of the controlled switch (29) in accordance with processed information supplied to the computing stage by the transducer, wherein, in accordance with the invention, the transducer (10, 40) is of the type which provides a single needle, or sharp output pulse when a piston of the engine moves towards top dead center (TDC) position;

and the system comprises a clock frequency generator (19) producing clock pulses at a fixed, predetermined rate;

a counter (17) connected to said generator to count at said rate;

and logic circuit means (15, 16, 18) connected to said counter (17) and to the transducer (10, 40) sensing the presence of a transducer pulse and enabling said counter to count until the next sensed transducer pulse to derive a count number representative of speed of the engine, whereby the counter will count during one pulse cycle, and then applying the count number in the counter to the computing stage, whereby, in the subsequent pulse cycle, the count number is available at the counter until the occurrence of a third following pulse initiating another cycle similar to said first cycle.

2. System according to claim 1, wherein the electronic computing stage (20, 43) carries out computation of the output signal during said subsequent pulse cycle.

3. System according to claim 1, including wave shaping means (14, 42) connected to the output of the transducer and providing a modified pulse having a finite pulse duration;

and wherein (FIG. 4) the logic circuit means apply the count number of the counter to the computing stage for computation by the computing stage during said finite time and within the next sensed transducer pulse.

4. System according to claim 3, further comprising frequency divider means (52, 54) connected to the transducer and to the clock pulses to provide speed-representative pulses at a divided, scaled rate.

5. System according to claim 4, wherein the frequency divider means comprises two counters (52, 54), the first counter (54) being a ring counter and providing overflow pulses when its count capacity has been reached, and the second counter accumulating the overflow pulses.

6. System according to claim 3, further comprising transfer switch means (55) responsive to speed of the engine;

said transfer switch means being coupled to the logic circuit means and applying the count number of the counter to the computing stage during the subsequent pulse cycle when the engine speed is above a predetermined level, and applying the count number to the computing stage during the following pulse within said finite time when the speed of the engine is below said predetermined level.

7. System according to claim 5, further including transfer switch means (55) responsive to said overflow signals from said ring counter (54) and transferring signals representative of the speed, based on the scaled clock pulses to said computing stage (20, 43).

8. System according to claim 5, further comprising transfer switch means (55) responsive to an overflow signal from said ring counter, said transfer switch means controlling said logic circuit means to apply the count number of the counter to the computing stage during said finite time during occurrence of a next sensed modified pulse if at least one overflow signal from said ring counter has been sensed, and applying the count number of the counter to the computing stage for computation during the subsequent pulse cylce if no overflow signal from said ring counter has been sensed in the first cycle.

9. System according to claim 1, wherein the computing stage is connected to and responsive to at least one operating parameter (n, α, T, p) of the engine, the computing stage providing two output values which control, respectively, the closing time of said controlled switch (29) and the opening time thereof, the time period between closing time and opening of said controlled switch being determined by the count number in said counter (17) as controlled by the occurrence of said output pulse, and as modified in accordance with computed modification values in said computing stage (20, 43).

10. System according to claim 1, wherein the transducer (10, 40) comprises a rotating part (11) having at least one marker element (13) thereon, and at least one pickup element (12, 41) responsive to said at least one marker.

11. System according to claim 10, wherein (FIG. 3) the transducer has two pickup elements (12, 41), two output stages (28, 44) are provided, each having a respective controlled switch, each pickup element controlling a respective output stage.

12. System according to claim 10, wherein said at least one marker is placed on the rotating part of the engine with an angle in advance of top dead center (TDC) position which is equal to the greatest possible angular advance plus a safety angle portion.

13. System according to claim 12, wherein the safety angle portion is small with respect to the maximum permissible angular advance.

14. System according to claim 1, wherein the transducer (10) is of the inductive type providing output signals which, inherently, have an angular occurrence with respect to the crankshaft of the engine which changes with speed of the engine in the direction of advance as the speed increases;

wherein the transducer comprises a rotating marker element (13) which is positioned at the greatest possible advance angle plus a safety angle zone, less the inherent advance angle of the output pulse with respect to top dead center (TDC) position.

15. System according to claim 1, wherein the computing stage (20, 43) comprises a microprocessor.

16. System according to claim 15, wherein the microprocessor comprises a single-chip integrated circuit.

17. System according to claim 15, wherein the system further includes at least one wave shaping stage;

and at least one of: the logic circuit means (15, 16, 18), the wave shaping stage (14), the clock frequency generator (19) are part of the microprocessor.

* * * * *

UNITED STATES PATENT AND TRADEMARK OFFICE
CERTIFICATE OF CORRECTION

PATENT NO. : 4,267,810
DATED : May 19, 1981
INVENTOR(S) : Jürgen WESEMEYER et al.

It is certified that error appears in the above-identified patent and that said Letters Patent is hereby corrected as shown below:

Col. 1, line 47, after "signal" insert --, in the form of needle, or sharp, abrupt pulses--.

Claim 3, lines 8 and 9 (col. 7, lines 43, 44), delete "transducer" and insert --modified--.

Signed and Sealed this

First Day of December 1981

[SEAL]

Attest:

GERALD J. MOSSINGHOFF

Attesting Officer    Commissioner of Patents and Trademarks